US008934127B2

(12) United States Patent
Nishiyama (10) Patent No.: US 8,934,127 B2
(45) Date of Patent: Jan. 13, 2015

(54) INFORMATION PROCESSING APPARATUS PERFORMING TRANSMISSION AND RECEPTION OF DIGITAL DATA WITH MEMORY MEDIUM, DISPLAY CONTROL METHOD THEREFOR, AND DISPLAY CONTROL PROGRAM (75) Inventor: Kaori Nishiyama, Tokyo (JP)

(73) Assignee: Canon Kabushiki Kaisha (JP)

( * ) Notice: Subject to any disclaimer, the term of this patent is extended or adjusted under 35 U.S.C. 154(b) by 480 days.

(21) Appl. No.: 13/198,068

(22) Filed: Aug. 4, 2011

(65) Prior Publication Data
US 2012/0050810 A1 Mar. 1, 2012

(30) Foreign Application Priority Data
Aug. 24, 2010 (JP) ................................. 2010-187170

(51) Int. Cl.
*G06F 15/00* (2006.01)
*H04N 1/00* (2006.01)
*H04N 1/21* (2006.01)
(52) U.S. Cl.
CPC ....... *H04N 1/00411* (2013.01); *H04N 1/00477* (2013.01); *H04N 1/2158* (2013.01); *H04N 2201/0036* (2013.01); *H04N 2201/0046* (2013.01); *H04N 2201/0072* (2013.01); *H04N 2201/0094* (2013.01)
USPC ........ 358/1.16; 358/1.14; 358/1.15; 709/229; 709/203
(58) Field of Classification Search
None
See application file for complete search history.

(56) References Cited

U.S. PATENT DOCUMENTS

| | | | | |
|---|---|---|---|---|
| 5,706,411 A * | 1/1998 | McCormick et al. | ........ | 358/1.14 |
| 6,486,968 B2 * | 11/2002 | Nishikawa | .................... | 358/1.15 |
| 6,642,943 B1 * | 11/2003 | Machida | ....................... | 715/763 |
| 6,727,999 B1 * | 4/2004 | Takahashi | .................... | 358/1.15 |
| 7,180,612 B2 * | 2/2007 | Shimizu | ....................... | 358/1.13 |
| 7,240,118 B2 * | 7/2007 | Yokokura | ..................... | 709/229 |

(Continued)

FOREIGN PATENT DOCUMENTS

JP 08-166898 A 6/1996
JP 2002-222391 A 8/2002

(Continued)

OTHER PUBLICATIONS

Japanese Office Action for corresponding JP 2010-187170, mail date Apr. 22, 2014.

*Primary Examiner* — Ashish K Thomas
(74) *Attorney, Agent, or Firm* — Rossi, Kimms & McDowell LLP (57) ABSTRACT An information processing apparatus enabling a user to easily select a desired memory medium from among a plurality of memory media connected thereto.
Appearance image information indicating an appearance image of the information processing apparatus is stored, in a case that the memory medium is connected to at least one of the plurality of media interfaces, media identification information identifying the connected memory medium and interface identification information identifying a media interface to which the memory medium is connected among the plurality of media interfaces are acquired, and a memory media connection screen showing the state of connection of the memory media to the information processing apparatus is generated, according to the appearance image information, the media identification information, and the interface identification information, to display the memory media connection screen on a display section.

16 Claims, 8 Drawing Sheets

(56) References Cited

U.S. PATENT DOCUMENTS

| | | | |
|---|---|---|---|
| 7,301,662 B2 * | 11/2007 | Mifune | 358/1.15 |
| 8,203,729 B2 * | 6/2012 | Miyake et al. | 358/1.14 |
| 8,422,056 B2 * | 4/2013 | Ueda et al. | 358/1.15 |
| 8,479,191 B2 * | 7/2013 | Harada | 717/174 |
| 2002/0145770 A1 * | 10/2002 | Nomura et al. | 358/505 |
| 2008/0002220 A1 * | 1/2008 | Song | 358/1.15 |

FOREIGN PATENT DOCUMENTS

| | | |
|---|---|---|
| JP | 2007-267142 A | 10/2007 |
| JP | 2008-176461 A | 7/2008 |

* cited by examiner

FIG.3A

| MEMORY MEDIA ID | POSITION INFORMATION |
|---|---|
| 0201 | 108 |
| 0202 | 109 |
| 0203 | 110 |

INFORMATION PROCESSING APPARATUS PERFORMING TRANSMISSION AND RECEPTION OF DIGITAL DATA WITH MEMORY MEDIUM, DISPLAY CONTROL METHOD THEREFOR, AND DISPLAY CONTROL PROGRAM

BACKGROUND OF THE INVENTION

1. Field of the Invention

The present invention relates to an information processing apparatus connected to a memory medium such as a removable medium and a flash memory, performing transmission and reception of digital data with the memory medium, and a display control method therefor, and a display control program.

2. Description of the Related Art

In general, an information processing apparatus represented by a personal computer is connected to a memory medium such as a removable medium and a flash memory via a general-purpose interface thereof. The information processing apparatus performs transmission and reception of digital data with the memory medium at the time of performing information processing. In this case, writing digital data into the memory medium from the information processing apparatus enables a user to carry the digital data easily with the memory medium.

For example, a CF card (Compact Flash Card), an SD memory (Secure Digital Memory Card), a USB (Universal Serial Bus) flash memory and the like are known as memory media. For example, digital data is written into a removable medium from one information processing apparatus on the basis of the standard of USB data transmission path, and the removable medium is connected to another information processing apparatus to read the digital data.

When a memory medium, such as a removable medium and a flash memory, is connected to an information processing apparatus, an OS (operating system) automatically recognizes the memory medium only by inserting the memory medium into a USB connection terminal, which enables reading and writing of the digital data.

Though it is possible to connect a plurality of memory media to an information processing apparatus, it is troublesome for a user to select one desired memory medium from among the plurality of memory media connected to the information processing apparatus.

In general, when a memory medium is connected to an information processing apparatus, the information processing apparatus (that is, an OS therein) assigns a drive name (for example, E:¥) to the memory medium. When specifying one memory medium, the user is required to specify a memory medium corresponding to a drive name assigned when the memory medium was connected, from a list of memory media connected to the information processing apparatus and drive names assigned to each of the memory media. Therefore, when a plurality of memory media are connected to the information processing apparatus, there is a possibility that the user selects a wrong drive.

In order to solve such a problem, it has been devised to call label names and document file names from memory media and create a list to identify the memory media. Here, if it is detected that a label name, which is a device identifier, is not set for a memory medium at the time of creating a list file, a CPU sets a label name for this memory medium.

On the other hand, if a label name is set for a memory medium, the label name and a document file name are read from the memory medium and stored into the list file. At the time of selecting a file, the CPU displays the contents of this list file as a list (for example, Japanese Laid-Open Patent Publication (Kokai) No. 8-166898).

When removing a memory medium from an information processing apparatus, the user is required to execute a process for secure removal. If the memory medium is removed from the information processing apparatus without executing the process, there may be caused, for example, a situation that the operation of the OS gets unstable. In order to avoid this, it is necessary that the user can accurately specify any memory medium.

As described above, it is necessary for a user, when accessing a memory medium connected to an information processing apparatus, not only to remember a drive name assigned to the memory medium but also to grasp, in advance, attributes such as a label name registered with the memory medium and the file name of a document stored in the memory medium.

Therefore, when a plurality of memory media are connected to the information processing apparatus, there is a problem that the user selects a wrong memory medium and takes much time to select a desired memory medium.

SUMMARY OF THE INVENTION

The present invention provides an information processing apparatus enabling a user to easily select a desired memory medium from among a plurality of memory media connected thereto, a display control method and a display control program.

In a first aspect of the present invention, there is provided an information processing apparatus provided with a plurality of media interfaces and performing transmission and reception of data with a memory medium connected to one of the plurality of media interfaces, the information processing apparatus comprising a storage unit adapted to store appearance image information indicating an appearance image of the information processing apparatus, an acquisition unit adapted to acquire, in a case that the memory medium is connected to at least one of the plurality of media interfaces, media identification information identifying the connected memory medium and interface identification information identifying a media interface to which the memory medium is connected among the plurality of media interfaces, and a display control unit adapted to generate a memory media connection screen showing the state of connection of the memory media to the information processing apparatus according to the appearance image information, the media identification information, and the interface identification information to display the memory media connection screen on a display section.

According to the present invention, when the plurality of memory media are connected to an information processing apparatus, a media connection screen is displayed which shows the external appearance of the information processing apparatus and memory media connection states in association with the media interfaces of the information processing apparatus. Therefore, there is obtained an advantage that a user can intuitively select a desired memory medium.

The above and other objects, features, and advantages of the invention will become more apparent from the following detailed description taken in conjunction with the accompanying drawings.

BRIEF DESCRIPTION OF THE DRAWINGS

FIGS. 3A and 3B are diagrams for illustrating examples of a media table and appearance image information described with reference to FIG. 2; FIG. 3A is a diagram showing an example of the media table.

DESCRIPTION OF THE EMBODIMENTS

The present invention will now be described in detail with reference to the drawings showing preferred embodiments thereof. It should be noted that the relative arrangement of the components, the numerical expressions and numerical values set forth in these embodiments do not limit the scope of the present invention unless it is specifically stated otherwise.

First Embodiment

Figure 1:
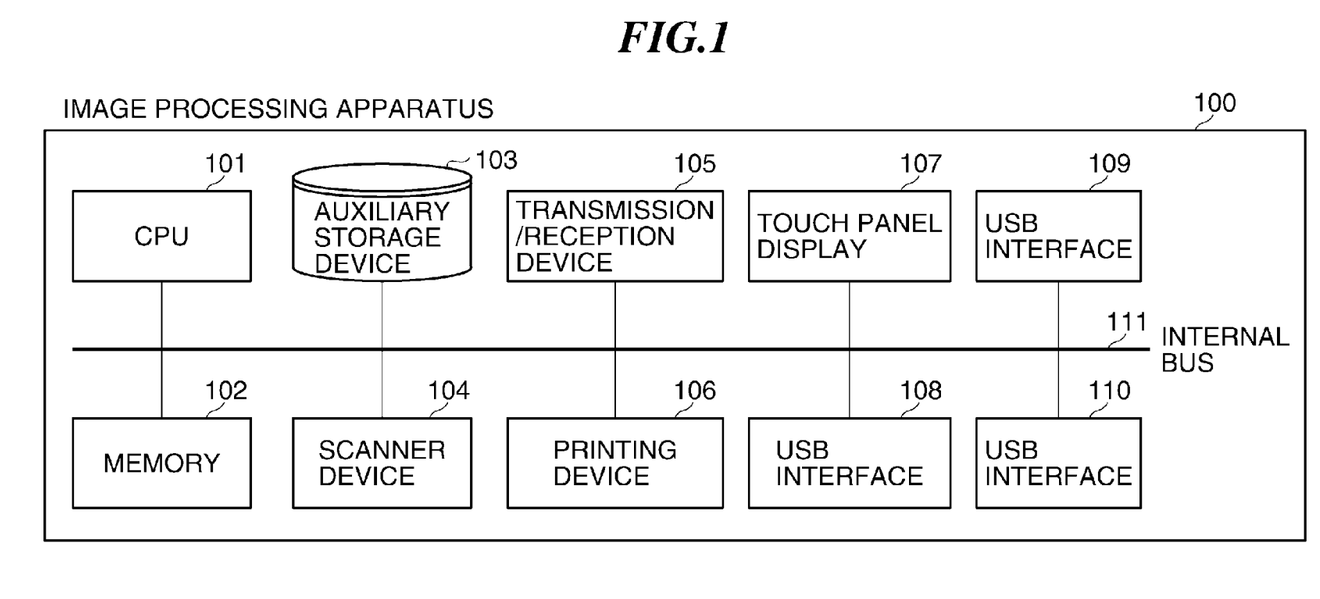
FIG. 1 is a block diagram showing the hardware configuration of an example of an image processing apparatus as one of information processing apparatuses according to an embodiment of the present invention.

FIG. 1 is a block diagram showing the hardware configuration of an example of an image processing apparatus as one of information processing apparatuses according to an embodiment of the present invention.

Referring to FIG. 1, an image processing apparatus 100 is provided with the following blocks: a CPU 101, a memory 102, an auxiliary storage device 103, a scanner device 104, a transmission/reception device 105, a printing device 106 (a printing section), a touch panel display 107 and a plurality of USB interfaces 108 to 110 (media interfaces). These blocks are connected to one another by an internal bus 111.

The CPU 101 is in charge of controlling the whole image processing apparatus 100. The memory 102 has a RAM and a ROM and is used as a storage place of programs and digital data (hereinafter referred to simply as data).

The auxiliary storage device 103 is a mass storage device such as a hard disk. In this auxiliary storage device 103, a large amount of data is stored, and program execution codes are held. That is, the auxiliary storage device 103, in comparison with the memory 102, stores such data that is required to be held for a long time.

The scanner device 104 optically scans a paper original or the like to obtain image data from the paper original or the like. The transmission/reception device 105 performs transmission and reception of data with an external equipment. For example, the transmission/reception device 105 performs fax transmission, e-mail transmission, SMB (server message block) transmission, and the like.

The printing device 106 prints the image data described above or image data received via the transmission/reception device onto a paper medium, for example, in accordance with an electrophotography process under the control of the CPU 101. It should be noted that the printing device 106 may perform printing in ink.

The touch panel display 107 displays various information to a user, and the user inputs an instruction. The USB interfaces 108 to 110 are interfaces for connecting various memory media or USB devices in conformity with the USB standard.

For example, electronic equipment such as a mouse, a keyboard, a disk drive, a digital camera, and a mobile phone are connected to the USB interfaces 108 to 110 as USB devices, in addition to memory media.

It should be noted that, though only the USB interfaces 108 to 110 are shown in the example shown in FIG. 1, the image processing apparatus 100 may be provided with various interfaces represented by a PCI slot or a PC card slot. Memory media connected to the media interfaces such as the USB interfaces may be various memory media such as a CF card and an SD memory in addition to USB memories.

A memory medium connected to any one of the USB interfaces 108 to 110 is used in conjunction with each function of the image processing apparatus 100. For example, when a memory medium is in conjunction with the auxiliary storage device 103, data is directly transmitted and received between the auxiliary storage device 103 and the memory medium.

When a memory medium is in conjunction with the scanner device 104, digital data created by the scanner device 104 is directly written into the memory medium connected to any one of the USB interfaces 108 to 110.

When a memory medium which is an external device is in conjunction with the transmission/reception device 105, data (for example, image data) received by the transmission/reception device 105 is written into the memory medium via any one of the USB interfaces 108 to 110. Then, the data held in the memory medium is transmitted by the transmission/reception device 105. When a memory medium is in conjunction with the printing device 106, the printing device 106 executes printing in accordance with data (for example, image data) held in the memory medium.

Memory media connected to the USB interfaces 108 to 110 can mutually transfer data among them under the control of CPU 101. The data transfer described above is executed under the control of the CPU 101.

Figure 2:
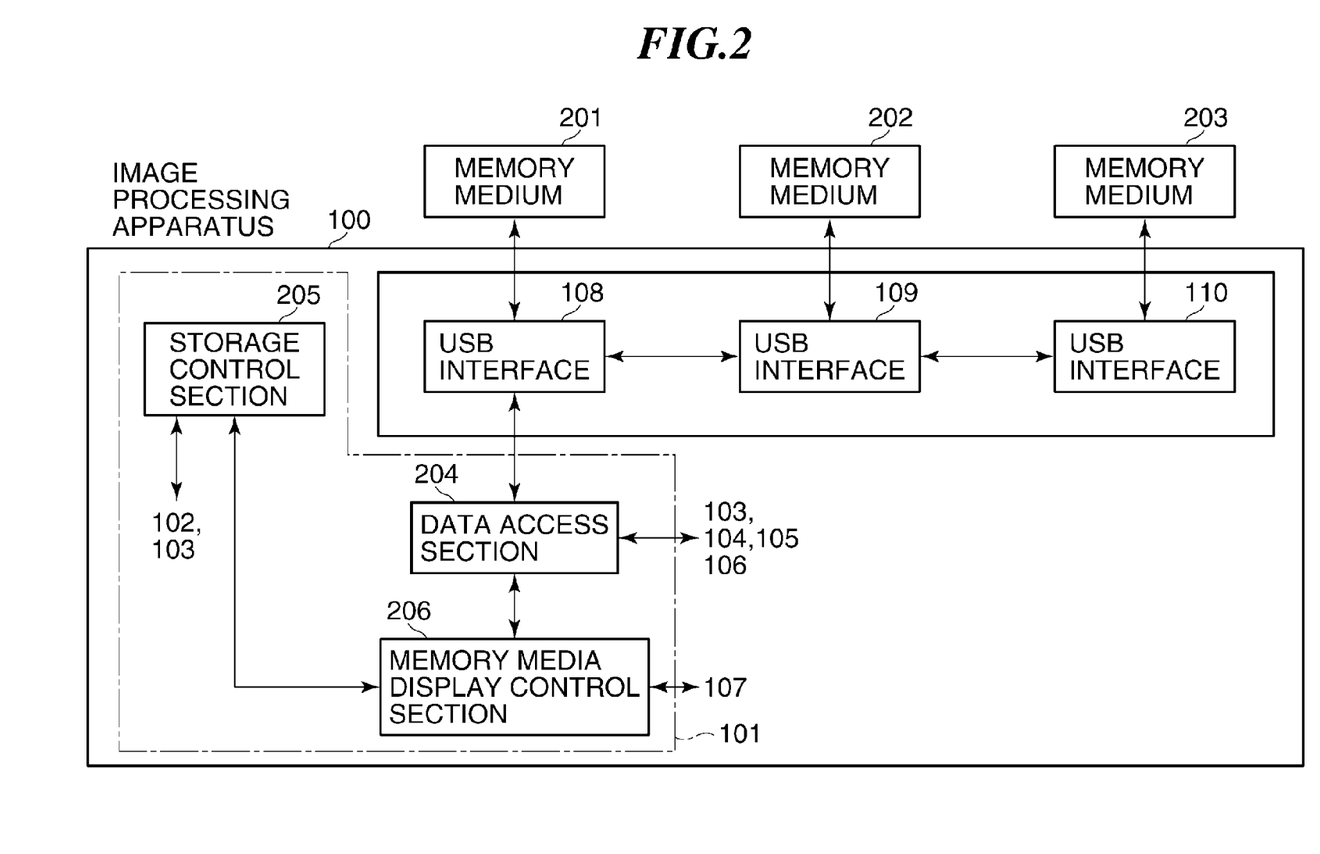
FIG. 2 is a functional block diagram for illustrating the functions of a CPU shown in FIG. 1.

FIG. 2 is a functional block diagram for illustrating the functions of the CPU 101 shown in FIG.1.

In FIG. 2, the CPU 101 has a data access section 204, a storage control section 205, and a memory media display control section 206. In the example shown in FIG. 2, it is assumed that memory media 201 to 203 are connected to the USB interfaces 108 to 110, respectively.

The data access section 204 (an access unit) accesses the memory media 201 to 203 via the USB interfaces 108 to 110 to execute reading and writing of data. When the memory media 201 to 203 are in conjunction with at least one of the auxiliary storage device 103, the scanner device 104, the transmission/reception device 105, and the printing device 106, data transmission and reception is performed via the data access section 204.

The storage control section 205 (identification unit) acquires the memory media ID's (media identification information) of the memory media 201 to 203 and connection position information (interface identification information) thereabout via the USB interfaces 108 to 110. The connection position information is information indicating the position of a USB interface to which a memory medium is connected. The storage control section 205 stores, into the memory 102 or the auxiliary storage device 103, the memory media ID's and the connection position information in association with each other as a media table.

It should be noted that, in the auxiliary storage device 103, there are stored an appearance image showing the external appearance of the image processing apparatus 100 and the positions of the USB interfaces 108 to 110 on the appearance image, as appearance image information.

Figure 3A:
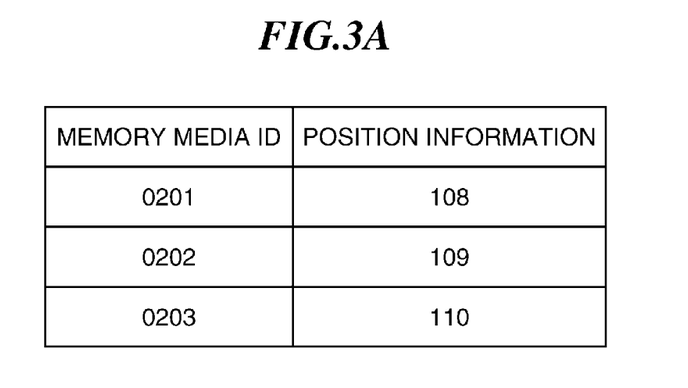
Figure 3B:
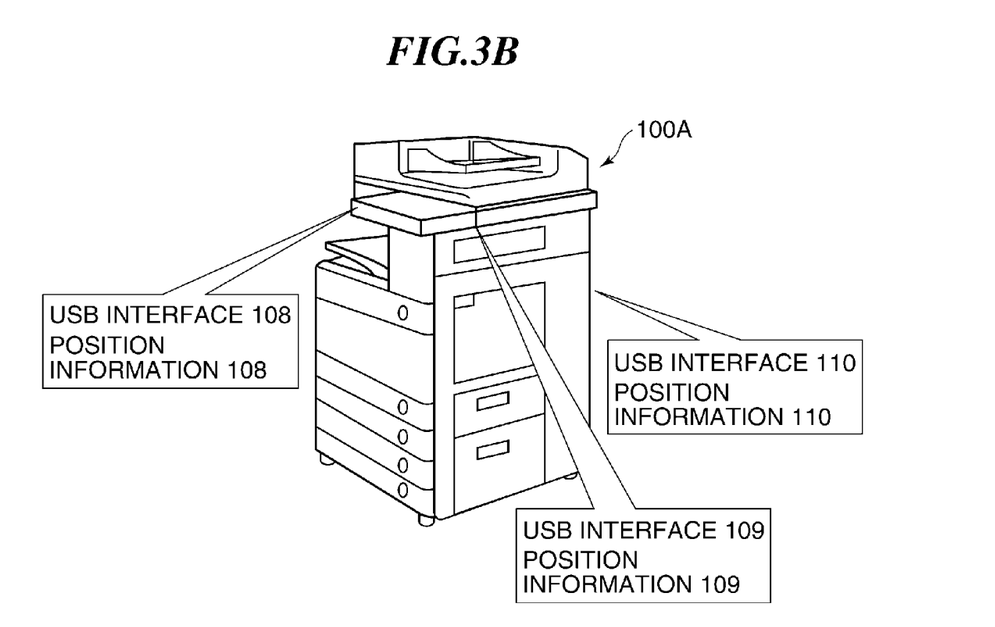
FIG. 3B is a diagram showing a memory media connection screen indicating the external appearance of the image forming apparatus shown by the appearance image information and positions of USB interfaces.

FIGS. 3A and 3B are diagrams for illustrating examples of the media table and appearance image information described with reference to FIG. 2. FIG. 3A is a diagram showing an example of the media table, and FIG. 3B is a diagram showing a memory media connection screen indicating the external appearance of the image forming apparatus 101 shown by the appearance image information and positions of USB interfaces.

As shown in FIG. 3A, the media table is provided with memory media ID's and connection position information (hereinafter referred to simply as position information) associated with the memory media ID's. This position information is, for example, information indicating the position of USB interface ports placed in the image processing apparatus 100, on the image processing apparatus 100. A number is given to each USB interface port (that is, each USB interface). That is, the position information is information for identifying the position of a USB interface to which a memory medium is connected.

In the examples shown in FIGS. 3A and 3B, numbers "108" to "110" are given to the USB interface ports corresponding to the USB interfaces 108 to 110, respectively, as the position information. Here, it is shown that the memory media 201 to 203 having the memory media ID's "0201" to "0203" are connected to the USB interface ports having the position information "108" to "110", respectively.

On the other hand, the memory media connection screen visually shows the connection positions of the memory media 201 to 203 on the external appearance of the image processing apparatus 100 as shown in FIG. 3B. In the example shown in FIG. 3B, the USB interfaces 108 to 110 are shown in an appearance image 100A of the image processing apparatus 100, and the position information "108" to "110" corresponding to the memory media ID's of connected memory media are visually shown.

The memory media display control section 206 (a display control unit) acquires the media table and the appearance image information from the memory 102 or the auxiliary storage device 103 via the storage control section 205 as described later. The memory media display control section 206 determines the memory media positions to be plotted on the appearance image of the image processing apparatus 100 according to the memory media ID's and position information in the media table. Then, the memory media display control section 206 displays the device's external appearance information indicating the plotted memory media positions which have been determined, on the touch panel display 107 together with the appearance image information indicating the appearance image of the image processing apparatus 100, as a memory media connection screen.

Figure 4:
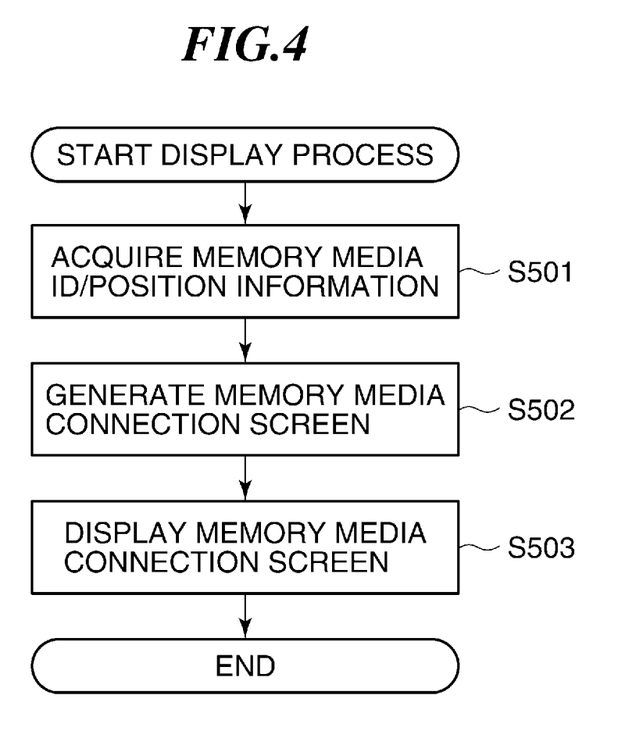
FIG. 4 is a flowchart showing a procedure for a memory media connection screen display process executed by the CPU shown in FIG. 2.

FIG. 4 is a flowchart showing a procedure for a memory media connection screen display process executed by the CPU 101 shown in FIG. 2.

Referring to FIGS. 2 and 4, it is assumed that the memory media 201 to 203 have just been connected to the USB interfaces 108 to 110 shown in FIG. 2, respectively. When the memory media 201 to 203 are connected to the USB interfaces 108 to 110, respectively, the storage control section 205 acquires memory media ID's (media identification information) via the USB interfaces 108 to 110.

Furthermore, the storage control section 205 acquires the memory media ID's of the memory media 201 to 203 connected to the USB interfaces 108 to 110 and the position information (interface identification information) thereabout (step S501). Then, as described before, the storage control section 205 stores a media table in which the memory media ID's and the position information are associated with each other, into the memory 102 or the auxiliary storage device 103.

Next, for example, when receiving an instruction to display a memory media connection screen from the touch panel display 107, the memory media display control section 206 acquires the media table and the appearance image information from the memory 102 or the auxiliary storage device 103 via the storage control section 205. Then, the memory media display control section 206 generates the memory media connection screen according to the media table and the appearance image information (step S502).

That is, the memory media display control section 206 generates the memory media connection screen indicating the connection state of the memory media on the image processing apparatus 100, which is constituted by device's external appearance information determined according to the memory media ID's and the position information in the media table and the appearance image of the image processing apparatus 100.

Next, the memory media display control section 206 displays the memory media connection screen on the touch panel display 107.

Figure 5:
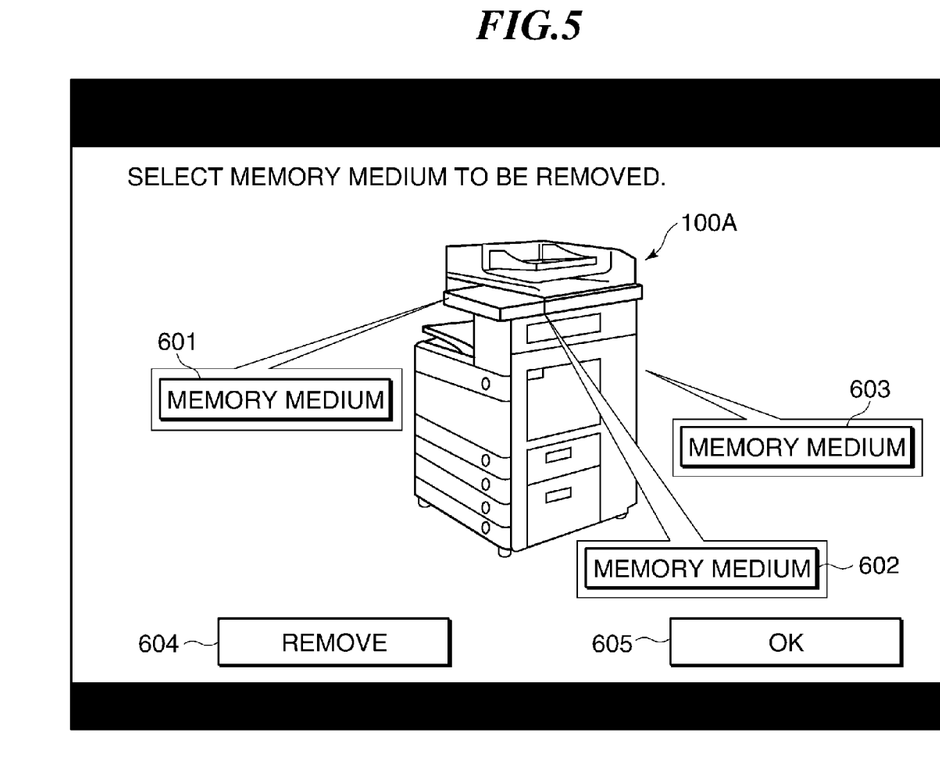
FIG. 5 is a diagram showing an example of the memory media connection screen displayed on a touch panel display shown in FIG. 1.

FIG. 5 is a diagram showing an example of the memory media connection screen displayed on the touch panel display 107 shown in FIG. 1.

In FIG. 5, an example is shown here in which a memory medium to be removed is selected on the memory media connection screen. On the appearance image 100A of the image processing apparatus 100, memory media buttons 601 to 603 are displayed. Here, the memory media button 601 is a button displayed when a memory medium is connected to the USB interface 108.

Similarly, the memory media button 602 is a button displayed when a memory medium is connected to the USB interface 109, and the memory media button 603 is a button displayed when a memory medium is connected to the USB interface 110.

When the user presses down the memory media button 601, 602 or 603, the memory media display control section 206 causes the pressed-down memory media button to be in a selected state. When the user again presses down the memory media button in the selected state, the memory media display control section 206 releases the selected state of the memory media button.

If the user wishes to remove one of the connected memory media, the user causes a memory media button corresponding to the memory medium to be removed, to be in a selected state by the above method on the memory media connection screen shown in FIG. 5. Next, when the user presses down a removal button 604, the memory media display control section 206 starts a process for writing out from the write cache of the relevant memory medium.

After that, when finishing the write cache process, the memory media display control section 206 displays that removal is possible, on the memory media connection screen. By the user pressing down an OK button 605 when this display is shown, the memory media display control section 206 ends the removal process. Thereby, the user can safely remove the memory medium that the user wishes to remove, from the image processing apparatus 100.

According to the first embodiment described above, since the memory medium connection screen is displayed which shows the positions of the USB interfaces existing on the image processing apparatus 100 and memory media connected to the USB interfaces, the user can intuitively know the positions of the memory media connected to the USB interfaces, which enables the image processing apparatus 100 to become user friendliness, and the operability thereof can be improved.

Second Embodiment

Figure 6A:
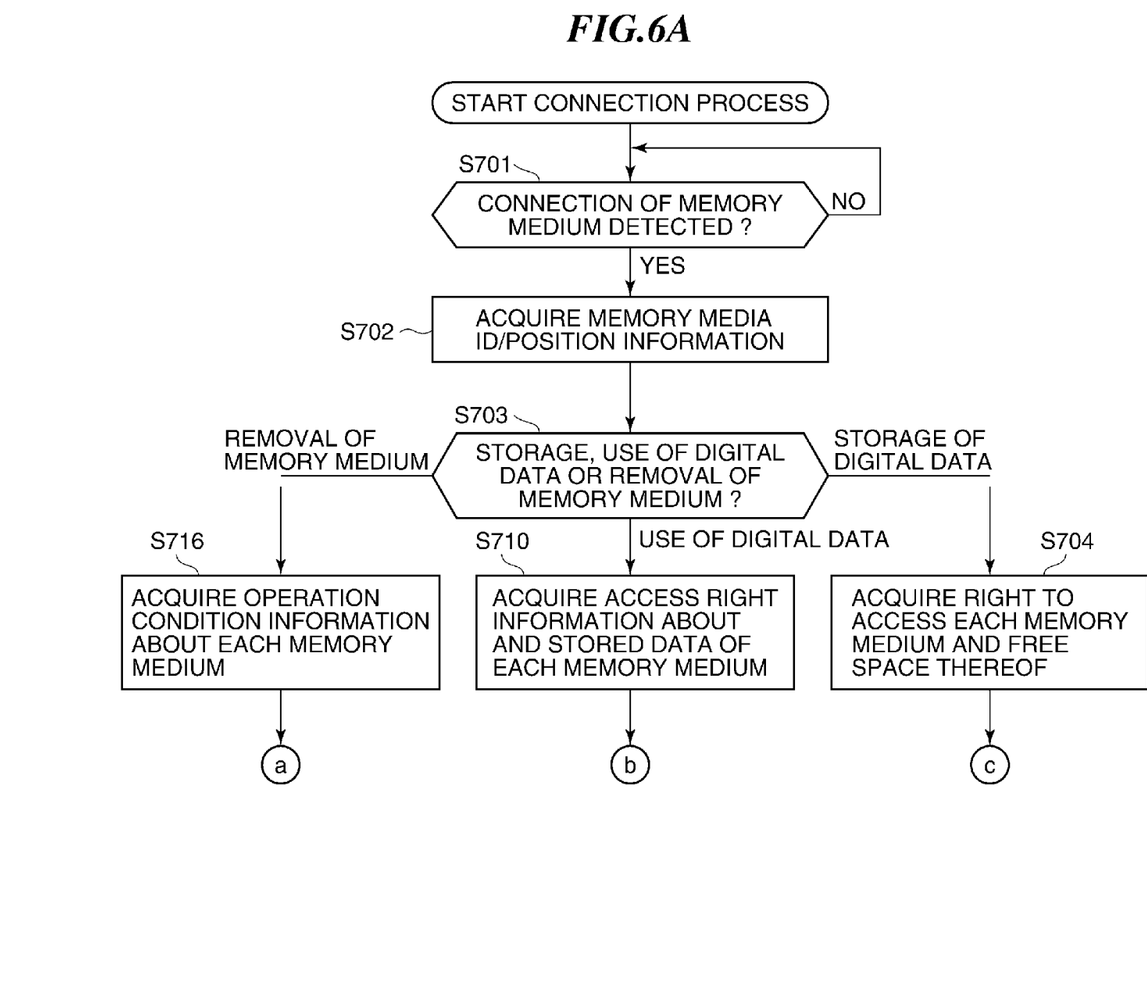
FIGS. 6A and 6B are flowcharts showing an example of a procedure for a process performed when a memory medium is connected to the information processing apparatus shown in FIG. 1.
Figure 6B:
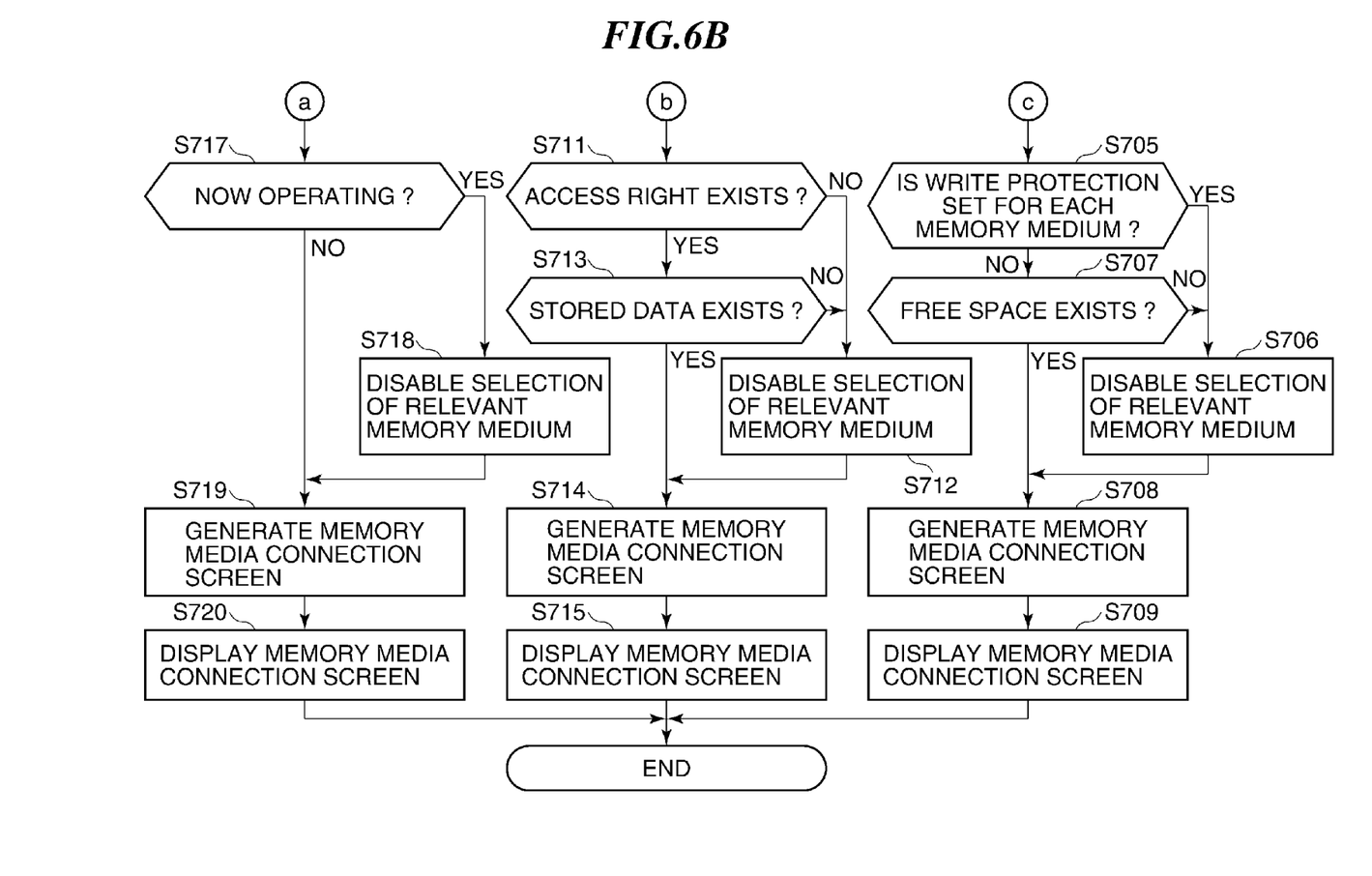

FIGS. 6A and 6B are flowcharts showing an example of a procedure for a process performed when a memory medium is connected to the information processing apparatus 100 shown in FIG. 1. Here, description will be made on the assumption that the connection process is performed by the CPU 101 shown in FIG. 1.

In FIGS. 6A and 6B, the CPU 101 first monitors whether or not a memory medium has been connected to any of the USB interfaces 108 to 110 (step S701). As a result of the monitoring, if a memory medium is not connected to any of the USB interfaces 108 to 110 (NO in step S701), the CPU 101 stands by.

On the other hand, if a memory medium is connected to at least one of the USB interfaces 108 to 110 (YES in step S701), the CPU 101 acquires the memory media ID of the memory medium connected to the USB interface and position information thereabout (step S702). Then, the media table is stored into the memory 102 or the auxiliary storage device 103 as described before.

Then, the CPU 101 determines which of data storage, data use, and memory medium removal operations has been performed by the user (step S703).

When it is determined in step S703 that the data storage operation has been performed by the user, the data access section 204 (FIG. 2) acquires the right to access each of connected memory media and acquires, from each of the memory media, information about the free space thereof (step S704). Then, the data access section 204 determines whether or not write protection is set for each of the memory media (step S705).

As for a memory medium for which write protection is set as a result of the determination in step S705 (YES in step S705), the data access section 204 disables selection of the memory medium (that is, causes the memory medium to be a selection-disabled medium; step S706) since it is not possible to write data into the memory medium. Then, a notification to the effect that selection is disabled is sent to the memory media display control section 206. Thereby, the memory media display control section 206 reads the media table and the appearance image information from the memory 102 or the auxiliary storage device 103 via the storage control section 205. Then, as described before, the memory media connection screen is generated (step S708). In this case, the memory media display control section 206 identifies the selection-disabled memory medium on the memory media connection screen.

Then, the memory media display control section 206 displays the memory media connection screen on the touch panel display 107 (step S709) and ends the process. In this case, a memory media button corresponding to the selection-disabled memory medium is displayed being shaded. It should be noted that a message to the effect that the memory medium is a selection-disabled medium may be displayed.

On the other hand, as for a memory medium for which write protection is not set as a result of the determination in step S705 (NO in step S705), the data access section 204 determines whether or not free space exists in the memory medium (step S707).

If it is determined that free space does not exist (NO in step S707), the data access section 204 causes the process to proceed to step S706 and disables selection of the memory medium. On the other hand, if it is determined that free space exists (YES in step S707), the data access section 204 enables selection of the memory medium and makes a notification to that effect to the memory media display control section 206.

After that, the memory media display control section 206 generates the memory media connection screen in step S708. In this case, the memory media display control section 206 identifies the selection-enabled memory medium on the memory media connection screen. Then, the memory media display control section 206 displays the memory media connection screen on the touch panel display 107 in step S709 and ends the process.

As a result of the determination in step S703, if the data use operation has been performed by the user, the data access section 204 (FIG. 2) acquires information about the existence or non-existence of the right to access each of the connected memory media (hereinafter referred to as access right information), and acquires information (hereinafter referred to as stored data information) about the existence or non-existence of data to be stored (hereinafter referred to as stored data) from each of the memory media (step S710). Then, the data access section 204 determines, for each memory medium, whether the right to access the medium exists or not on the basis of the acquired access right information (step S711).

As for a memory medium for which it is determined that the right to access the memory does not exist (NO in step 711), the data access section 204 disables selection of the memory medium (that is, causes the memory medium to be a selection-disabled medium; step S712) since it is not possible to access data stored in the memory medium. Then, a notification to the effect that selection is disabled is sent to the memory media display control section 206.

Thereby, the memory media display control section 206 generates a memory media connection screen as described before (step S714). In this case, the memory media display control section 206 identifies the selection-disabled memory medium on the memory media connection screen.

Then, the memory media display control section 206 displays the memory media connection screen on the touch panel display 107 (step S715) and ends the process.

As for a memory medium for which it is determined that the right to access the memory exists (YES in step 711), the data access section 204 determines whether stored data exists in the memory medium (step S713). If it is determined that the stored data does not exist (NO in step S713), the data access section 204 causes the process to proceed to step S712 and disables selection of the memory medium.

On the other hand, if it is determined that the stored data exists (YES in step S713), the data access section 204 enables selection of the memory medium and makes a notification to that effect to the memory media display control section 206.

Thereby, the memory media display control section 206 generates the memory media connection screen in step S714. In this case, the memory media display control section 206 identifies the selection-enabled memory medium on the memory media connection screen. Then, the memory media display control section 206 displays the memory media connection screen on the touch panel display 107 in step S715 and ends the process.

In step S703, if it is determined that the memory medium removal operation has been performed by the user, the data access section 204 (FIG. 2) acquires information (operation condition information) about the operation condition (which indicates, for example, initial state, recognition standby, during removal process, now reading, and now storing) of each of connected memory media (step S716). Then, the data access section 204 determines whether the memory medium is operating or not on the basis of the acquired operation condition information (step S717).

As for a memory medium determined to be operating (YES in step 717), the data access section 204 disables selection of the memory medium (that is, causes the memory medium to be a selection-disabled medium; step S718) since it is not possible to remove the memory medium. Then, a notification to the effect that selection is disabled is sent to the memory media display control section 206.

Thereby, the memory media display control section 206 generates the memory media connection screen as described before (step S719). In this case, the memory media display control section 206 identifies the selection-disabled memory medium on the memory media connection screen.

Then, the memory media display control section 206 displays the memory media connection screen on the touch panel display 107 (step S720) and ends the process.

As for a memory medium determined not to be operating (NO in step S717), the data access section 204 enables selection of the memory medium and makes a notification to that effect to the memory media display control section 206.

Thereby, the memory media display control section 206 generates the memory media connection screen in step S719. In this case, the memory media display control section 206 identifies the selection-enabled memory medium on the memory media connection screen. Then, the memory media display control section 206 displays the memory media connection screen on the touch panel display 107 in step S720 and ends the process.

Figure 7:
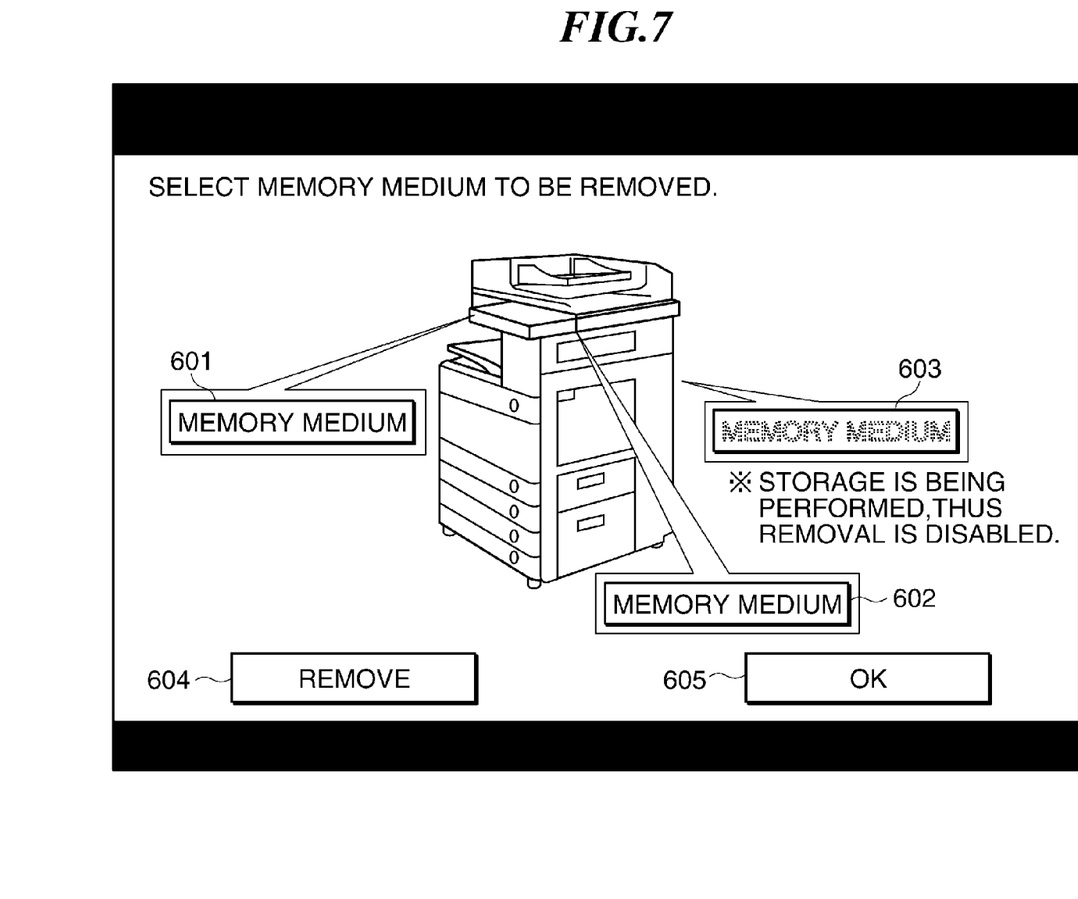
FIG. 7 is a diagram showing an example of the memory media connection screen displayed on the touch panel display shown in FIG. 1.

FIG. 7 is a diagram showing an example of the memory media connection screen displayed on the touch panel display 107 shown in FIG. 1. Here, the memory medium connection screen displayed in step S720, which has been described with reference to FIGS. 6A and 6B, is shown.

In FIG. 7, the memory media button 603 corresponding to the memory medium caused to be a selection-disabled medium in step S718 is displayed in grayout (being shaded) here. Immediately below the memory media button 603, there is displayed a message of "Storage is being performed, and removal is disabled." That is, immediately below the memory media button 603, there is provided a message display area 802 for displaying the notification to the effect that selection is disabled, which has been sent from the data access section 204 to the memory media display control section 206 after the processing in step S718, and a message to the effect that "storage is being performed, and removal is disabled" is displayed in this message display area 802.

Thus, the user can recognize in advance that selection is disabled, without a warning message being displayed after selection of removal. Thus, the user does not have to perform an extra process.

As described above, in the second embodiment, each of selection-enabled and selection-disabled memory media is identifiably displayed on the memory media connection screen according to a selected operation, and therefore, the user can easily select a desired memory medium. The user can intuitively grasp a selectable memory medium connected to the image processing apparatus on the memory media connection screen showing the connection state of the memory media on the image processing apparatus by displaying the device's external appearance information and the appearance image information indicating the appearance image of the image processing apparatus.

Apparent from the above description, in FIG. 2, the data access section 204 functions as an access unit, and the storage control section 205 functions as an identification unit. The memory media display control section 206 functions as a display control unit.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-187170, filed Aug. 24, 2010, which is hereby incorporated by reference herein in its entirety.

What is claimed is:

1. An information processing apparatus provided with a plurality of media interfaces and performing transmission and reception of data with a memory medium connected to one of the plurality of media interfaces, the information processing apparatus comprising:

a storage unit adapted to store appearance image information indicating an appearance image of the information processing apparatus;

an acquisition unit adapted to acquire, in a case that a memory medium is connected to each of at least one of the plurality of media interfaces, media identification information identifying the connected memory medium and interface identification information identifying a media interface to which the memory medium is connected among the plurality of media interfaces; and a display control unit adapted to generate a memory media connection screen according to the appearance image information, the media identification information, and the interface identification information to display the memory media connection screen on a display section, the memory media connection screen displaying a pictorial representation of the information processing apparatus, and a user-selectable pictorial representation of a physical location, on the information processing apparatus, of the connected memory medium;

wherein said display control unit is adapted to select the connected memory media in a case that the user-selectable pictorial representation is selected by a user, start acquiring predetermined information from the selected memory media in a case that a predetermined user instruction is received after the selection, and notify the user that an operation in accordance with the predetermined user instruction is executable to the selected memory media in a case that the predetermined information is successfully acquired.

2. The information processing apparatus according to claim 1, further comprising:
an access unit adapted to access the memory medium connected to one of the plurality of media interfaces to determine whether or not write protection against data writing is set for the memory medium, wherein
in the case that said access unit determines that the write protection is set for the memory medium, said display control unit shows the memory medium as a selection-disabled medium on the memory media connection screen.

3. The information processing apparatus according to claim 1, further comprising:
an access unit adapted to determine whether the right to access the memory medium connected to one of the plurality of media interfaces, exists or not, wherein
in the case that said access unit determines that the right to access the memory medium does not exist, said display control unit shows the memory medium as a selection-disabled medium on the memory media connection screen.

4. The information processing apparatus according to claim 1, further comprising:
a determination unit adapted to determine, when the memory medium connected to one of the plurality of media interfaces is removed, whether removal of the memory medium is disabled or not, according to the operation condition of the memory medium, wherein
in the case that said determination unit determines that the removal of the memory medium is disabled, said display control unit shows the memory medium as a selection-disabled medium on the memory media connection screen.

5. The information processing apparatus according to claim 1, further comprising a printing unit adapted to execute printing according to the data.

6. The information processing apparatus according to claim 1, wherein the memory medium is at least one of a CF card, an SD card, and a USB memory.

7. A display control method that is used in an information processing apparatus provided with a plurality of media interfaces and performing transmission and reception of data with a memory medium connected to one of the plurality of media interfaces, and that performs display control of connection information about connection of the memory medium, wherein the information processing apparatus is provided with a storage unit storing appearance image information showing an appearance image of the information processing apparatus, the display control method comprising:
an acquisition step of acquiring, in a case that a memory medium is connected to each of at least one of the plurality of media interfaces, media identification information identifying the connected memory medium and interface identification information identifying a media interface to which the memory medium is connected among the plurality of media interfaces; and
a display control step of generating a memory media connection screen according to the appearance image information, the media identification information, and the interface identification information to display the memory media connection screen on a display section,
the memory media connection screen displays a pictorial representation of the information processing apparatus, and a user-selectable pictorial representation of a physical location, on the information processing apparatus, of the connected memory medium;
wherein said display control step selects the connected memory media in a case that the user-selectable pictorial representation is selected by a user, starts acquiring predetermined information from the selected memory media in a case that a predetermined user instruction is received after the selection, and notifies the user that an operation in accordance with the predetermined user instruction is executable to the selected memory media in a case that the predetermined information is successfully acquired.

8. A non-transitory computer-readable storage medium storing a display control program that, when executed by a computer, causes the computer to execute a display control method that is used in an information processing apparatus provided with a plurality of media interfaces and performing transmission and reception of data with a memory medium connected to one of the plurality of media interfaces, and that performs display control of connection information about connection of the memory medium, wherein the information processing apparatus is provided with a storage unit storing appearance image information showing an appearance image of the information processing apparatus, the display control method comprising:
an acquisition step of acquiring, in a case that a memory medium is connected to each of at least one of the plurality of media interfaces, media identification information identifying the connected memory medium and interface identification information identifying a media interface to which the memory medium is connected among the plurality of media interfaces; and
a display control step of generating a memory media connection screen according to the appearance image information, the media identification information, and the interface identification information to display the memory media connection screen on a display section,
the memory media connection screen displays a pictorial representation of the information processing apparatus, and a user-selectable pictorial representation of a physical location, on the information processing apparatus, of the connected memory medium;
wherein said display control step selects the connected memory media in a case that the user-selectable pictorial representation is selected by a user, starts acquiring predetermined information from the selected memory media in a case that a predetermined user instruction is received after the selection, and notifies the user that an operation in accordance with the predetermined user instruction is executable to the selected memory media in a case that the predetermined information is successfully acquired.

9. The information processing apparatus according to claim 1, wherein said display control unit is adapted to start acquiring a write cache written out from the selected memory media as the predetermined information, in a case that the operation in accordance with the predetermined user instruction is a memory medium removal operation.

10. An information processing apparatus provided with a plurality of media interfaces and performing transmission and reception of data with a memory medium connected to one of the plurality of media interfaces, the information processing apparatus comprising:
a storage unit adapted to store appearance image information indicating an appearance image of the information processing apparatus;
a first acquisition unit adapted to acquire, in a case that a memory medium is connected to each of at least one of the plurality of media interfaces, media identification information identifying the connected memory medium and interface identification information identifying a media interface to which the memory medium is connected among the plurality of media interfaces;

a second acquisition unit adapted to acquire predetermined information from the connected memory media in a case that a predetermined user instruction is received;

a determining unit adapted to determine based on the acquired predetermined information whether or not an operation in accordance with the predetermined user instruction is executable to the connected memory media;

a display control unit adapted to generate a memory media connection screen according to the appearance image information, the media identification information, the interface identification information, and the determining result of said determining unit to display the memory media connection screen on a display section, wherein the memory media connection screen displays a pictorial representation of the information processing apparatus, and displays, in a case that the determining result indicates that the operation is executable to the connected memory media, a user-selectable pictorial representation of a physical location, on the information processing apparatus, of the connected memory medium.

11. The information processing apparatus according to claim 10, wherein said second acquisition unit is adapted to acquire from the connected memory media as the predetermined information, a right to access thereof and information about a free space thereof, in a case that the operation in accordance with the predetermined instruction is a data storage operation.

12. The information processing apparatus according to claim 10, wherein said second acquisition unit is adapted to acquire from the connected memory media as the predetermined information, access right information thereof and stored data information thereof, in a case that the operation in accordance with the predetermined instruction is a data use operation.

13. The information processing apparatus according to claim 10, wherein said second acquisition unit is adapted to acquire from the connected memory media as the predetermined information, operation condition information thereof, in a case that the operation in accordance with the predetermined instruction is a memory medium removal operation.

14. The information processing apparatus according to claim 10, wherein said display control unit is adapted to display, in a case that the determining result indicates that the operation is not executable to the connected memory media, a pictorial representation of a physical location, on the information processing apparatus, of the connected memory medium, and a message indicating the determining result adjacent thereto.

15. A display control method that is used in an information processing apparatus provided with a plurality of media interfaces and performing transmission and reception of data with a memory medium connected to one of the plurality of media interfaces, wherein the information processing apparatus is provided with a storage unit adapted to store appearance image information indicating an appearance image of the information processing apparatus, the display control method comprising:

a first acquisition step of acquiring, in a case that a memory medium is connected to each of at least one of the plurality of media interfaces, media identification information identifying the connected memory medium and interface identification information identifying a media interface to which the memory medium is connected among the plurality of media interfaces;

a second acquisition step of acquiring predetermined information from the connected memory media in a case that a predetermined user instruction is received;

a determining step of determining, based on the acquired predetermined information, whether or not an operation in accordance with the predetermined user instruction is executable to the connected memory media;

a display control step of generating a memory media connection screen according to the appearance image information, the media identification information, the interface identification information, and the determining result of said determining step to display the memory media connection screen on a display section, wherein the memory media connection screen displays a pictorial representation of the information processing apparatus, and displays, in a case that the determining result indicates that the operation is executable to the connected memory media, a user-selectable pictorial representation of a physical location, on the information processing apparatus, of the connected memory medium.

16. A non-transitory computer-readable storage medium storing a display control program that, when executed by a computer, causes the computer to execute a display control method that is used in an information processing apparatus provided with a plurality of media interfaces and performing transmission and reception of data with a memory medium connected to one of the plurality of media interfaces, wherein the information processing apparatus is provided with a storage unit adapted to store appearance image information indicating an appearance image of the information processing apparatus, the display control method comprising:

a first acquisition step of acquiring, in a case that a memory medium is connected to each of at least one of the plurality of media interfaces, media identification information identifying the connected memory medium and interface identification information identifying a media interface to which the memory medium is connected among the plurality of media interfaces;

a second acquisition step of acquiring predetermined information from the connected memory media in a case that a predetermined user instruction is received;

a determining step of determining, based on the acquired predetermined information, whether or not an operation in accordance with the predetermined user instruction is executable to the connected memory media;

a display control step of generating a memory media connection screen according to the appearance image information, the media identification information, the interface identification information, and the determining result of said determining step to display the memory media connection screen on a display section, wherein the memory media connection screen displays a pictorial representation of the information processing apparatus, and displays, in a case that the determining result indicates that the operation is executable to the connected memory media, a user-selectable pictorial representation of a physical location, on the information processing apparatus, of the connected memory medium.

* * * * *